US012624951B1

(12) United States Patent
Zhu et al.

(10) Patent No.: US 12,624,951 B1
(45) Date of Patent: May 12, 2026

(54) UNDERWATER POINT SOURCE POLARIZED LIGHT DETECTION DEVICE AND HEADING ANGLE MEASUREMENT METHOD

(71) Applicant: UNIVERSITY OF SHANGHAI FOR SCIENCE AND TECHNOLOGY, Shanghai (CN)

(72) Inventors: Daqi Zhu, Shanghai (CN); Mingzhi Chen, Shanghai (CN); Yuan Liu, Shanghai (CN); Weifeng Chen, Shanghai (CN); Hongfei Li, Shanghai (CN); Jibo Bo, Shanghai (CN); Wen Pang, Shanghai (CN); Jianmin Zhu, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 19/198,843

(22) Filed: May 5, 2025

(30) Foreign Application Priority Data

Dec. 20, 2024 (CN) .......................... 202411884473.2

(51) Int. Cl.
*G01C 21/02* (2006.01)
*G01C 21/20* (2006.01)
(Continued)

(52) U.S. Cl.
CPC ........... *G01C 21/203* (2013.01); *G01C 21/02* (2013.01); *G01J 4/04* (2013.01); *G01N 21/21* (2013.01);
(Continued)

(58) Field of Classification Search
CPC ............ G01C 21/02; G01J 4/04; G01N 21/21
(Continued)

(56) References Cited

U.S. PATENT DOCUMENTS

| | | | | |
|---|---|---|---|---|
| 7,027,198 B2 * | 4/2006 | Yao | ......................... | G02B 27/28 |
| | | | | 359/259 |
| 7,436,569 B2 * | 10/2008 | Yao | .................... | H04B 10/2569 |
| | | | | 359/259 |

FOREIGN PATENT DOCUMENTS

| | | |
|---|---|---|
| CN | 102575960 A | 7/2012 |
| CN | 111854957 A | 10/2020 |

(Continued)

OTHER PUBLICATIONS

Xu, J., Li, H., Lv, W., Kong, F., Li, X., Li, G., . . . & Guo, Y. (2023). Design of a real-time orientation sensor based on atmospheric polarization light. Applied Optics, 62(25), 6680-6688. (Year: 2023).*

(Continued)

*Primary Examiner* — Cuong H Nguyen
(74) *Attorney, Agent, or Firm* — NKL Law; Allen Xue

(57) ABSTRACT

The present disclosure provides an underwater point source polarized light detection device and a heading angle measurement method, which are applied to the field of polarization navigation technologies. The polarized light detection device includes a base, a rotating detection platform provided on the base, and three sets of polarized light detection modules provided on top of the rotating detection platform. The three sets of polarized light detection modules are of the same structure, each set of detection module consists of a pair of polarization analyzing channels with transmission directions perpendicular to each other, the other two sets of detection modules are positioned such that polarized light detection directions thereof are bilaterally symmetric in the same plane about a zenith polarized light detection direction and that an included angle between each of the polarized light detection directions and the zenith polarized light detection direction does not exceed 5°, and the rotating detection platform is configured to be rotatable for 360° about an axis of the zenith polarized light detection (Continued)

direction. The heading angle measurement method using the detection device has advantages of good adaptability to underwater environments and requiring a reduced number and types of polarization analyzing channels.

9 Claims, 5 Drawing Sheets

(51) Int. Cl.

| | |
|---|---|
| *G01J 4/04* | (2006.01) |
| *G01N 21/01* | (2006.01) |
| *G01N 21/21* | (2006.01) |
| *G01C 21/24* | (2006.01) |
| *G01C 21/26* | (2006.01) |

(52) U.S. Cl.
CPC .............. *G01C 21/24* (2013.01); *G01C 21/26* (2013.01); *G01N 2021/0112* (2013.01)

(58) Field of Classification Search
USPC ............................................ 356/367; 701/21
See application file for complete search history.

(56) References Cited

FOREIGN PATENT DOCUMENTS

| | | | | | |
|---|---|---|---|---|---|
| CN | 114937075 A | | 8/2022 | | |
| CN | 115290190 A | | 11/2022 | | |
| CN | 116256772 A | * | 6/2023 | .............. | G01S 17/89 |
| CN | 118032787 A | * | 5/2024 | .............. | G01N 21/01 |
| CN | 119334471 B | * | 3/2025 | .............. | G01C 1/00 |
| CN | 119618210 A | * | 3/2025 | .............. | G01P 21/02 |
| KR | 20210013738 A | * | 2/2021 | ........... | G06Q 50/184 |
| KR | 20210014705 A | * | 2/2021 | ............. | G06Q 50/10 |
| WO | 2013057582 A1 | | 4/2013 | | |

OTHER PUBLICATIONS

Dai, Pengzhang, Dong Yao, Tianxiang Ma, Honghai Shen, Weiguo Wang, and Qingyu Wang. "Analysis of polarization detector performance parameters on polarization 3D imaging accuracy." Sensors 23, No. 11 (2023): 5129. (Year: 2023).*

Zou, Yangyang, Liu Zhang, Jian Zhang, Bonan Li, and Xueying Lv. "Developmental trends in the application and measurement of the Bidirectional Reflection Distribution Function." Sensors 22, No. 5 (2022): 1739. (Year: 2022).*

Zhu, Yong, et al. "Detection of underwater targets using polarization laser assisted echo detection technique." Applied Sciences 13.5 (2023): 3222. (Year: 2023).*

Xu, Jinfeng, et al. "Design of a real-time orientation sensor based on atmospheric polarization light." Applied Optics 62.25 (2023): 6680-6688. (Year: 2023).*

Zhou, Guan-Hua et al., "Polarization Information of Ocean Color Remote Sensing", Journal of Remote Sensing, Mar. 15, 2008, vol. 12, No. 2, pp. 322-330.

Fang, Zheng et al., "Solution of light vector superposition heading in zenith region of underwater sky polarization image", Journal of Measurement Science and Instrumentation, Jun. 30, 2024, vol. 15, No. 2, pp. 157-165.

Zhang, Haosu et al., "Underwater Horizontal Attitude Determination Technology Based on Fusion Power Circle Theory and Improved 3D Cone Hough Transform", Electronics, Nov. 27, 2024, vol. 13, No. 23, pp. 1-22.

* cited by examiner

Solar meridian

Solar meridian

UNDERWATER POINT SOURCE POLARIZED LIGHT DETECTION DEVICE AND HEADING ANGLE MEASUREMENT METHOD

TECHNICAL FIELD

The present disclosure relates to the field of polarized light navigation technologies, and in particular to an underwater point source polarized light detection device and a heading angle measurement method.

BACKGROUND

Sunlight is a natural resource, and contains abundant physical information that can be used to guide practical activities, such as atmospheric information for analyzing atmospheric composition, temperature, and pressure distribution, or polarized light information for navigation and positioning. It has been known that some aerosol particles in the atmosphere scatter sunlight, and the vibration direction of part of light waves is limited to a specific direction, thereby forming the polarized light. In order to effectively capture useful polarized light information in the atmosphere, a number of devices have been provided for detecting the polarized light in the prior art. For example, Chinese Patent Publication No. CN101694456A discloses a sensor for detecting an all-sky atmospheric polarization mode and a relevant method for processing detection signals, and Chinese Patent Publication No. CN101441171A discloses a signal processing and compensating method of four-channel atmosphere polarization information detection sensor, both of which are intended to realize related technical purposes, such as navigation and positioning of a bionic robot or an underwater vehicle, by means of detecting and analyzing atmospheric polarized light information in a target area.

In underwater environments, GPS signals are denied, and inertial navigation suffers from cumulative errors. In order to improve the heading angle accuracy of underwater robots during long-range navigation, biomimetic polarized light navigation methods have become a research hotspot. The so-called biomimetic polarized light navigation method refers to a method that mimics the navigation methods of creatures like Cataglyphis and bees, which use the regular distribution of atmospheric polarized light for navigation. It has been known that the distribution of atmospheric polarized light follows at least the following laws: under a Rayleigh scattering model, the direction of polarized light at the solar meridian and the anti-solar meridian is perpendicular to the solar meridian and the anti-solar meridian, the polarization direction at any observation point in the atmosphere is perpendicular to a line connecting the observation point and the sun, the atmospheric polarized light exhibits the symmetric characteristic with respect to the solar meridian and the anti-solar meridian, and the polarization degree on the anti-solar meridian side is greater than that on the solar meridian side.

The point source-type polarized light navigation method based on local polarized light areas in the sky is one of the common biomimetic polarized light navigation methods in the prior art. The method typically adopts the following steps to measure the heading angle. Firstly, a polarized light image in the zenith direction is collected through a polarization detection sensor with four channels (i.e., four polarization analyzing channels). Next, the collected polarized light image is processed, and polarization degree information and polarization angle information relative to the reference direction at an observation point is resolved by using methods such as light intensity variation curve analysis or Stokes vector analysis. Then, an included angle between the heading direction of the vehicle and the solar meridian, i.e., the heading angle of the vehicle, is calculated according to the obtained polarization angle information. In the process, due to the 180-degree periodicity of the polarization state as it varies with the polarization angle, there is a problem that two polarization angles can lead to the same polarization state, i.e., the 180-degree ambiguity problem. In order to solve the problem, existing technologies, such as heading angle measurement methods based on the PFAC model or the K-means clustering algorithm, require the detection of atmospheric polarization information from different sky areas deviating from the zenith direction, to estimate the specific azimuth of the sun by using the atmospheric polarization information.

The existing point source-type polarized light navigation method has at least the following potential problems in application. First, refraction effects generated when light enters different media lead to a difference between an atmospheric polarization mode detected at an atmospheric detection point in a direction deviating from the zenith and a polarization mode detected at a corresponding underwater detection point, such that the above heading angle measurement method requiring the detection of the atmospheric polarization information deviating from the zenith direction cannot be applied to underwater environments, failing to solve the 180-degree ambiguity problem. Second, the polarized light detection sensor based on the PFAC model requires two types of polarization analyzing channels, a polarization information receiving channel and a non-polarization information receiving channel, as well as time-division multiplexing for signal processing, which not only increases the structural complexity of the sensor itself, but also complicates the processing of the polarization information. The heading angle measurement method based on the K-means clustering algorithm typically requires a plurality of four-channel polarized light detection sensors to detect the atmospheric polarization information from different target directions in the sky in the same time period as the basis for clustering analysis. Due to the large number of channels required to be controlled in the detection sensors, the number of photoelectric detection devices and circuit control devices increases accordingly, resulting in a higher structural complexity of the whole detection system. Furthermore, due to the need to ensure the consistency and accuracy of data transmission across channels, the processing of the polarization information is complicated and the measurement costs are increased.

In view of this, at least the following urgent problems in the prior art need to be addressed, i.e., how to apply the above detection method for detecting polarized light in multi-point sky areas based on atmospheric detection points to underwater environments, so as to further reduce the number and types of polarization analyzing channels used by a detection device or system on the basis of ensuring the detection accuracy of polarized light information at underwater detection points, while reducing the complexity of the channels in processing the polarized light information.

SUMMARY

In view of the above, embodiments of the specification provide an underwater point source polarized light detection device and a heading angle measurement method. The polarized light detection device has advantages of good adaptability to underwater environments and requiring a reduced number and types of polarization analyzing channels, and the heading angle measurement method has advantages of high measurement accuracy and controllable costs.

The specification provides the following technical solutions.

Firstly, an underwater point source polarized light detection device is provided. The underwater point source polarized light detection device includes a base, a rotating detection platform provided on the base, and three sets of polarized light detection modules provided on top of the rotating detection platform, where one of the three sets of detection modules is configured to receive and detect zenith polarized light, the other two sets of detection modules are separately configured to receive and detect zenith right-side polarized light and zenith left-side polarized light, the three sets of polarized light detection modules are of the same structure, each of the three sets of detection modules consists of a pair of polarization analyzing channels with transmission directions perpendicular to each other, the other two sets of detection modules are positioned such that polarized light detection directions thereof are bilaterally symmetric in the same plane about a zenith polarized light detection direction and that an included angle between each of the polarized light detection directions and the zenith polarized light detection direction does not exceed 5°, and the rotating detection platform is configured to be rotatable for 360° about an axis of the zenith polarized light detection direction.

In order to optimize the above solution, the following measures are further adopted. Preferably, the pair of polarization analyzing channels are polarization analyzing channels with transmission directions of 0° and 90°, separately, and each of the polarization analyzing channels includes a polarization analyzer, and a light intensity detection component and a voltage detection component that are electrically connected to the polarization analyzer.

Preferably, a reference plane, a left mounting surface, and a right mounting surface that are arranged in an isosceles trapezoid are provided on the top of the rotating detection platform, the reference plane is located at a position of an upper base of the isosceles trapezoid, the left mounting surface and the right mounting surface are separately located at positions of legs of the isosceles trapezoid, the detection module configured to detect the zenith polarized light is arranged on the reference plane, the detection module configured to detect the zenith left-side polarized light is arranged on the left mounting surface, and the detection module configured to detect the zenith right-side polarized light is arranged on the right mounting surface.

A heading angle measurement method for measuring a heading angle of an underwater vehicle by using the above underwater point source polarized light detection device is further provided, where the base of the polarized light detection device is horizontally fixed on the underwater vehicle, and the heading angle measurement method includes the following steps:

S1: determining a reference direction for resolving the heading angle of the underwater vehicle, selecting a reference polarization analyzing channel from the paired polarization analyzing channels in each polarized light detection module, where the transmission directions of the selected reference polarization analyzing channels are the same, and arranging the transmission directions of all the reference polarization analyzing channels to be parallel to the reference direction in an initial state;

S2: controlling the rotating detection platform to continuously rotate in a horizontal direction, collecting a detection voltage corresponding to each polarization analyzing channel on the rotating detection platform in real time until a difference between the detection voltages of each pair of polarization analyzing channels is maximized, and recording a rotation angle of the rotating detection platform relative to the reference direction at this time as $\theta_a$;

and S3: calculating, in combination with the rotation angle $\theta_a$ or the rotation angle $\theta_a$ and the perpendicular relationship of the transmission directions of the paired polarization analyzing channels, an included angle $\theta_s$ between the reference direction and projection lines of a solar meridian and an anti-solar meridian on corresponding detection points, and correcting the included angle $\theta_s$ in combination with polarization information of the detected zenith right-side polarized light and zenith left-side polarized light to obtain an included angle between the reference direction and the solar meridian, i.e., the heading angle $\beta$.

In order to optimize the above solution, the following measures are further adopted. Preferably, in the S3, a specific azimuth of the solar meridian is determined by using the collected detection voltages of the reference polarization analyzing channels in the zenith right-side polarized light detection module and the zenith left-side polarized light detection module in combination with a Rayleigh scattering model and a corresponding relationship between a polarization degree of the polarized light and the detection voltage in the polarization analyzing channel, so as to correct the included angle $\theta$, and obtain the heading angle $\beta$, where a range of the included angle $\theta_s$ is $[0°, 180°]$, and a range of the heading angle $\beta$ is $[0°, 360°]$.

Preferably, in the S1-S2, the transmission directions of the paired polarization analyzing channels are $\theta_1$ and $\theta_2$, separately, $\theta_2=90°+\theta_1$, the polarization analyzing channel with the transmission direction $\theta_1$ in an initial state is used as the reference polarization analyzing channel, and the detection voltage corresponding to the reference polarization analyzing channel in each pair of polarization analyzing channels is minimized while the difference between the detection voltages of each pair of polarization analyzing channels is maximized.

Preferably, in the S2, the difference between the detection voltages of each pair of polarization analyzing channels is determined to be maximized and the rotation angle $\theta_a$ at this time is recorded according to the following formula:

$$\theta_a = \text{argmin}\left\{ \log\left[\frac{U_{\theta_1}}{U_{\theta_2}}\right]_{Middle} + \log\left[\frac{U_{\theta_1}}{U_{\theta_2}}\right]_{Right} + \log\left[\frac{U_{\theta_1}}{U_{\theta_2}}\right]_{Left} \right\}$$

where $$\log\left[\frac{U_{\theta_1}}{U_{\theta_2}}\right]_{Middle}, \log\left[\frac{U_{\theta_1}}{U_{\theta_2}}\right]_{Right}, \text{ and } \log\left[\frac{U_{\theta_1}}{U_{\theta_2}}\right]_{Left}$$

are separately logarithms of ratios of the detection voltage $U_{\theta_1}$ corresponding to the polarization analyzing channel with the transmission direction $\theta_1$ to the detection voltage $U_{\theta_2}$ corresponding to the polarization analyzing channel with the transmission direction $\theta_2$ in the zenith polarized light detection module, the zenith right-side polarized light detection module, and the zenith left-side polarized light detection module.

Preferably, when $\theta_1=0°$, and then $\theta_2=90°$, the heading angle $\beta$ is calculated according to the following relation:

$$\beta = \begin{cases} \theta_s, & U_L < U_R \\ \theta_s + 180°, & U_L > U_R \end{cases}$$

where $U_R$ is the detection voltage corresponding to the polarization analyzing channel with the transmission direction of 0° in the zenith right-side detection module, and $U_L$ is the detection voltage corresponding to the polarization analyzing channel with the transmission direction of 0° in the zenith left-side detection module.

Preferably, in the S2, the difference between the corresponding detection voltages of each pair of polarization analyzing channels is determined to be maximized and the rotation angle $\theta_a$ at this time is recorded according to the following formula:

$$\theta_a = \mathrm{argmax}\left\{ \log\left[\frac{U_{\theta_2}}{U_{\theta_1}}\right]_{Middle} + \log\left[\frac{U_{\theta_2}}{U_{\theta_1}}\right]_{Right} + \log\left[\frac{U_{\theta_2}}{U_{\theta_1}}\right]_{Left} \right\}$$

where $$\log\left[\frac{U_{\theta_2}}{U_{\theta_1}}\right]_{Middle}, \log\left[\frac{U_{\theta_2}}{U_{\theta_1}}\right]_{Right}, \text{ and } \log\left[\frac{U_{\theta_2}}{U_{\theta_1}}\right]_{Left}$$

are separately logarithms of ratios of the detection voltage $U_{\theta_2}$ corresponding to the polarization analyzing channel with the transmission direction $\theta_2$ to the detection voltage $U_{\theta_1}$ corresponding to the polarization analyzing channel with the transmission direction $\theta_1$ in the zenith polarized light detection module, the zenith right-side polarized light detection module, and the zenith left-side polarized light detection module.

Preferably, in the S2, the detection voltage corresponding to the reference polarization analyzing channel in each pair of polarization analyzing channels is maximized while the difference between the corresponding detection voltages of each pair of polarization analyzing channels is maximized.

Compared with the prior art, the above at least one technical solution adopted in the embodiments of the specification can achieve at least the following beneficial effects. First, the underwater point source polarized light detection device is provided with three sets of polarized light detection modules, and the polarized light detection directions of the zenith left-side polarized light detection module and the zenith right-side polarized light detection module are inclined within 5° in the same plane relative to the polarized light detection direction of the zenith polarized light detection module. That is, the left-side and right-side polarized light detection modules only receive the polarized light information on the left side and the right side of the zenith of a local window with a refraction angle within 5°. In this window, the underwater polarization mode detected by the detection module is almost the same as the atmospheric polarization mode detected at a corresponding atmospheric detection point, such that the application range of the heading angle measurement method based on the atmospheric polarization mode in multiple scenarios can be expanded to underwater environments. Moreover, each polarized light detection module only uses two polarization analyzing channels with transmission directions perpendicular to each other to detect polarized light, such that the number and types of detection light channels are reduced, allowing a simpler structure of the detection device, simple and efficient processing of channel information, and reduced costs of heading angle measurement.

Furthermore, the heading angle measurement method in the embodiment can determine whether or not the reference polarization analyzing channel rotates to the position parallel or perpendicular to the solar meridian plane only by monitoring the magnitudes and the differences of the detection voltage values of the paired polarization analyzing channels in the three sets of polarized light detection modules. Then, the initial heading angle of the underwater vehicle, i.e., the included angle $\theta_s$, within a range of [0°, 180°], can be calculated in combination with the rotation angle of the reference polarization analyzing channel along with the rotating detection platform. The range of the included angle $\theta_s$ is expanded to [0°, 360°] in combination with the distribution law of the polarization degrees at two sides of the solar meridian and the anti-solar meridian under the Rayleigh scattering model. Therefore, the 180-degree ambiguity problem present in the heading angle measurement process is solved with reduced resolving steps required and a single type of variables to be monitored in the measurement process, which is convenient for the consistency and certainty analysis of parameters in each polarization analyzing channel, thereby improving the accuracy and reliability of the measurement results.

BRIEF DESCRIPTION OF THE DRAWINGS

To describe the technical solutions in the embodiments of the present disclosure more clearly, the following briefly describes the accompanying drawings required for the embodiments. Apparently, the accompanying drawings in the following description show merely some embodiments of the present disclosure, and those of ordinary skill in the art may still derive other drawings from these accompanying drawings without creative efforts.

REFERENCE NUMERALS

Figure 1:
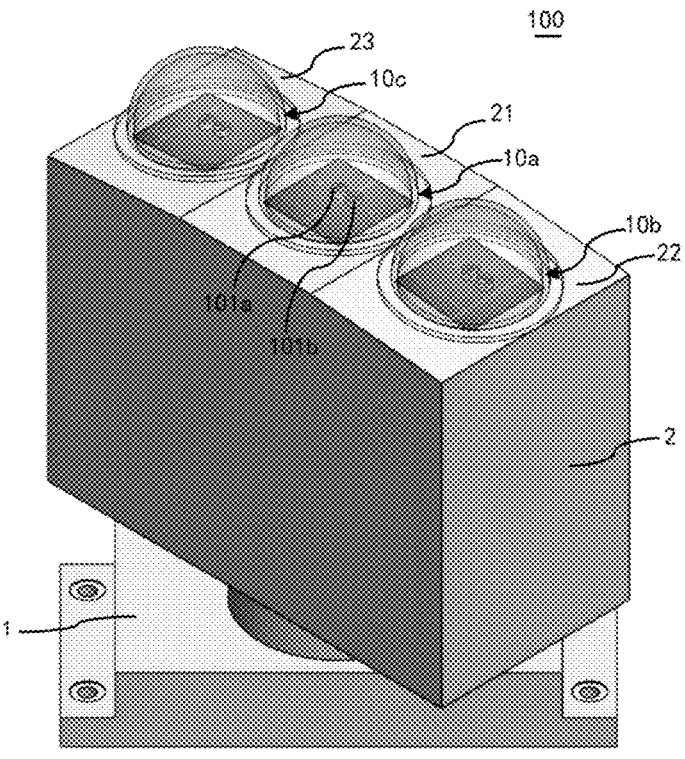
FIG. 1 is a schematic structural diagram of a polarized light detection device in a rotating state according to Embodiment 1.

100, polarized light detection device; 10*a*, zenith polarized light detection module; 101*a*, 0° polarization analyzing channel; 101*b*, 90° polarization analyzing channel; 10*b*, zenith right-side polarized light detection module; 10*c*, zenith left-side polarized light detection module; 1, base; 2, rotating detection platform; 21, reference plane; 22, right mounting surface; 23, left mounting surface; 3, acrylic seal cover.

DETAILED DESCRIPTION

The embodiments of the present disclosure are described in detail below with reference to the accompanying drawings.

The embodiments of the present disclosure are illustrated below through specific examples, and other advantages and effects of the present disclosure can be easily understood by those skilled in the art based on the contents disclosed herein. It is apparent that the described embodiments are only a part of the embodiments of the present disclosure, but not all of them. The present disclosure can also be implemented or applied through other different specific embodiments. Various modifications or changes to the details in the description can be made based on different perspectives and applications without departing from the spirit of the present disclosure. It should be noted that, unless conflicting, the embodiments and features of the embodiments below may be combined with each other. Based on the embodiments in the present disclosure, all other embodiments obtained by those of ordinary skill in the art without creative work shall fall within the protection scope of the present disclosure.

It should be noted that various aspects of the embodiments are described below that are within the scope of the appended claims. It should be apparent that the aspects described herein may be embodied in a wide variety of forms and that any specific structure and/or function described herein is merely illustrative. Based on the present disclosure, those skilled in the art should understand that one aspect described herein may be implemented independently from any other aspect, and that two or more of these aspects may be combined in various ways. For example, an apparatus may be implemented and/or a method may be practiced by using any number and aspects set forth herein. In addition, such an apparatus may be implemented and/or such a method may be practiced by using other structures and/or functionalities than one or more of the aspects set forth herein.

It should be further noted that the drawings provided in the following embodiments are only for illustrating the basic concepts of the present disclosure, and the drawings only show the components related to the present disclosure rather than being drawn according to the numbers, shapes, and sizes of the components in actual implementation. The types, numbers, and proportions of the components may be changed freely in actual implementation, and the layout of the components may be more complicated.

The embodiments of the specification provide an underwater point source polarized light detection device and a heading angle measurement method, which are intended to solve the problems in the prior art that the detection method for detecting polarized light in multi-point sky areas based on atmospheric detection points cannot be applied to underwater environments and that the structure of the used polarized light detection device is complex, such that polarized light information detected at an underwater detection point can be accurately restored to polarized light information detected at a corresponding detection point in the atmosphere, and the number and types of the used polarization analyzing channels are reduced, thereby reducing the complexity for processing the polarized light detection information.

The following describes specific embodiments of the polarized light detection device and the heading angle measurement method in detail with reference to the accompanying drawings.

Embodiment 1

Figure 2:
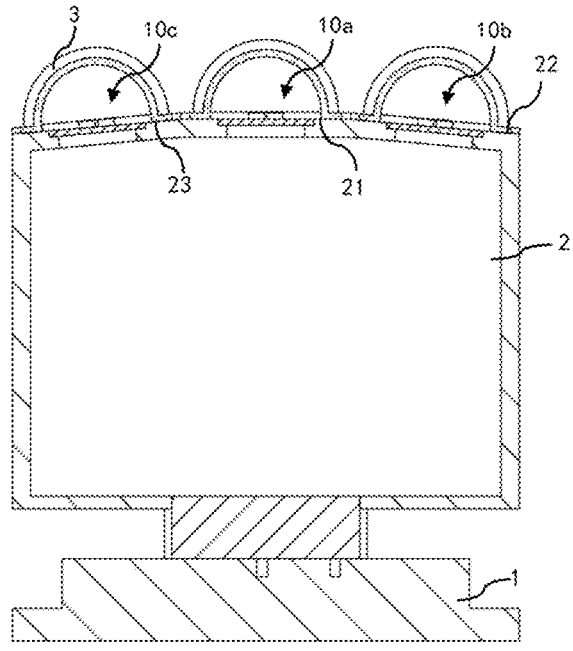
FIG. 2 is a schematic cross-sectional view of the polarized light detection device according to Embodiment 1.

As shown in FIG. 1 and FIG. 2, in this embodiment, the underwater point source polarized light detection device 100 includes a base 1, a rotating detection platform 2 provided on the base 1, and three sets of polarized light detection modules provided on top of the rotating detection platform 2, where one set of detection module, i.e., a zenith polarized light detection module 10*a*, is configured to receive and detect zenith polarized light, the other two sets of detection modules, i.e., a zenith right-side polarized light detection module 10*b* and a zenith left-side polarized light detection module 10*c*, are separately configured to receive and detect zenith right-side polarized light and zenith left-side polarized light, the three sets of polarized light detection modules are of the same structure, each set of detection module consists of a pair of polarization analyzing channels with transmission directions perpendicular to each other, the other two sets of detection modules are positioned such that polarized light detection directions thereof are bilaterally symmetric in the same plane about a zenith polarized light detection direction and that an included angle between each of the polarized light detection directions and the zenith polarized light detection direction does not exceed 5°, and the rotating detection platform is configured to be rotatable for 360° about an axis of the zenith polarized light detection direction.

In this embodiment, the pair of polarization analyzing channels are polarization analyzing channels with transmission directions of 0° and 90°, separately, and in other embodiments, for example, polarization analyzing channels with transmission directions of 60° and 150°, separately, or polarization analyzing channels with transmission directions of 45° and 135°, separately, may also be used. The polarization analyzing channel includes a polarization analyzer, and a light intensity detection component and a voltage detection component that are electrically connected to the polarization analyzer, where the transmission direction refers to an included angle between a light transmission axis of the polarization analyzer and a reference direction of the polarization analyzer. The light intensity detection component includes a photodiode mounted below the corresponding polarization analyzer, the photodiode can generate a responsive current for the spectrum within the wavelength range of the polarized light at the underwater target detection point, and the voltage detection component is connected to an output node of the photodiode and is configured to collect a voltage value reflecting the light intensity. The photodiode senses the light intensity after the light passes through the polarization analyzer and converts the light intensity into a measurable voltage at the node, and then the voltage value can be collected by the voltage detection component.

As shown in FIGS. 1 and 2, as an embodiment, a reference plane 21, a left mounting surface 23, and a right mounting surface 22 that are arranged in an isosceles trapezoid are provided on the top of the rotating detection platform 2, the reference plane is located at the position of the upper base of the isosceles trapezoid, the left mounting surface 23 and the right mounting surface 22 are separately located at the positions of the legs of the isosceles trapezoid, the zenith polarized light detection module 10$_a$ is arranged on the reference plane 21, the zenith left-side polarized light detection module 10c is arranged on the left mounting surface 23, and the zenith right-side polarized light detection module 10b is arranged on the right mounting surface 22. In other embodiments, the top of the rotating detection platform 2 may also be designed to be spherical or in other forms, as long as the polarized light detection directions at two sides of the zenith are bilaterally symmetric in the same plane about the zenith polarized light detection direction and the included angle between each of the polarized light detection directions and the zenith polarized light detection direction does not exceed 5°. Preferably, each polarized light detection module is covered by a transparent acrylic seal cover 3 that is mounted on the corresponding plane. A watertight mounting cavity for mounting a control module and a power module that are electrically connected to the polarization analyzing channel is provided in the rotating detection platform 2, the bottom of the watertight mounting cavity is connected to the base 1 through a turntable, and a watertight socket that is electrically connected to the power module is further provided on the side wall of the rotating detection platform 2.

In this embodiment, the polarized light detection directions of the zenith right-side polarized light detection module and the zenith left-side polarized light detection module are inclined within 5° in the same plane relative to the polarized light detection direction of the zenith polarized light detection module. That is, the left-side and right-side polarized light detection modules only receive the polarized light information on the left side and the right side of the zenith of a local window with a refraction angle within 5°. In this window, the polarization angle of the underwater polarized light detected by the detection module is almost the same as the polarization angle of the atmospheric polarized light detected at a corresponding atmospheric detection point, such that the application range of the heading angle measurement method based on the atmospheric polarization mode in multiple scenarios can be well expanded to underwater environments.

Figure 7:
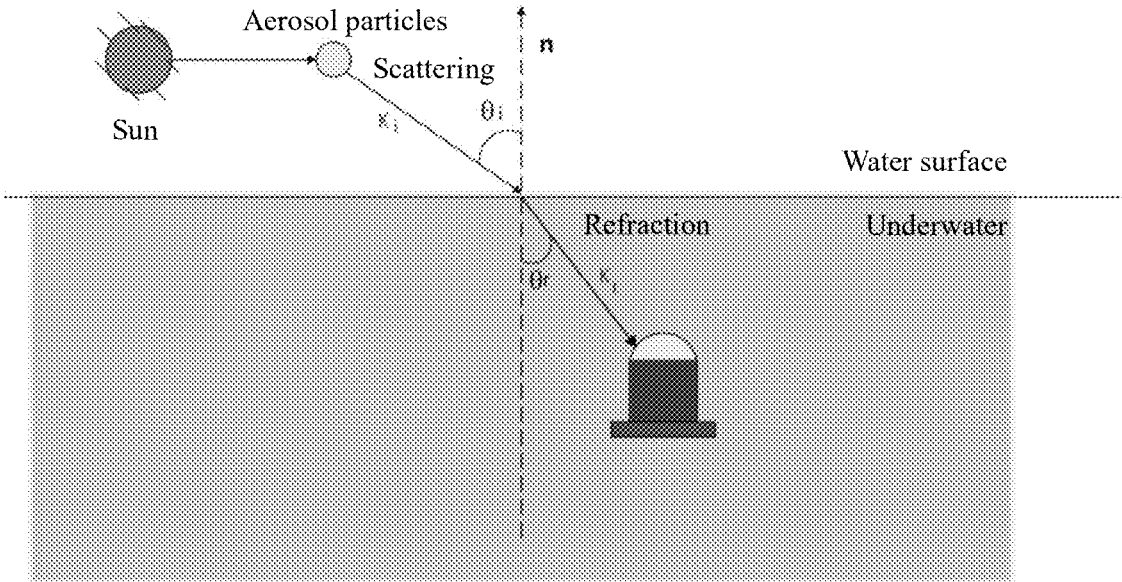
FIG. 7 is a schematic diagram of a refraction path of atmospheric polarized light from an air medium into an underwater target detection point.

As shown in FIG. 7, assuming that sunlight is scattered by particles, such as gas particles and aerosols in the atmosphere to generate polarized light ($K_i$, $X_i$, $S_i$), and the polarized light is then refracted at the water surface to generate polarized light ($K_r$, $X_r$, $S_d$) in a Snell window, which is transmitted to the target detection module. Here, $K_i$ is a wave vector of the atmospheric scattered light, $X_i$ is a polarization direction vector of the atmospheric scattered light, $S_i$ is a Stokes vector of the atmospheric scattered light, $K_r$ is a wave vector of the underwater refracted light, $X_r$ is a polarization direction vector of the underwater refracted light, and $S_d$ is a Stokes vector of the underwater refracted light. The air-water interface is defined by the normal vector n of the interface and true refractive indexes $\eta_a$ and $\eta_w$ of air and water. Here, $\theta_i$ is an angle of incidence of the polarized light, $\theta_r$s a refraction angle of the polarized light, $\eta_w$ is the refractive index of water of 1.33, and $\eta_a$ is the refractive index of air of 1. According to the refraction law, a relation for the Stokes vector $S_d$ of the polarized light measured at the underwater target detection point and the Stokes vector $S_i$ of the atmospheric polarized light measured at the corresponding detection point in the air is: $S_d=M_R S_i$, where the Mueller matrix $M_R$ can be calculated by using the following formula:

$$M_R = \begin{bmatrix} t_s^2+t_p^2 & t_s^2-t_p^2 & 0 & 0 \\ t_s^2-t_p^2 & t_s^2+t_p^2 & 0 & 0 \\ 0 & 0 & 2t_s t_p & 0 \\ 0 & 0 & 0 & 2t_s t_p \end{bmatrix}$$

Here, $t_s$ and $t_p$ are parameters of the refraction process, and can be separately calculated by using the following formulas:

$$t_s = \frac{2K_i \cdot n}{(K_i + K_t) \cdot n}, \ t_p = \frac{2\eta_a \eta_w K_i \cdot n}{(\eta_w^2 K_i + \eta_a^2 K_t) \cdot n}$$

Here, it can be known from the foregoing that $K_t$ is the wave vector of the underwater refracted light, and can be calculated by using the following formula:

$$K_t = K_a - n\sqrt{(\eta_w/\eta_a)^2 |K_i|^2 - |K_a|^2}$$

Here, $|K_i|$ denotes the modulus of the wave vector $K_i$, $K_a$ is a wave vector of the transmitted light from the air medium into the water medium, $|K_a|$ denotes the modulus of the wave vector $K_a$, and $K_a$ can be calculated by using the following formula:

$$K_a = K_i - (K_i \cdot n)n$$

Here, $S_i$ is denoted as $[I_i \ Q_i \ U_i \ 0]$, $S_d$ is denoted as $[I_d \ Q_d \ U_d \ 0]$, where $I_i$ and $I_d$ are separately total light intensities of the scattered light and the underwater refracted light, $Q_i$ and $U_i$ are separately Stokes components of the scattered light in two directions perpendicular to each other, and $Q_d$ and $U_d$ are separately Stokes components of the refracted light in two directions perpendicular to each other. According to the calculation formula of the polarization angle of the polarized light, the atmospheric polarization angle $POA_i$ before refraction and the refraction angle $POA_d$ of the polarized light at the underwater observation point after refraction can be separately calculated by using the following formulas:

$$POA_i = \frac{Q_i}{U_i}, \ POA_d = \frac{Q_d}{U_d}$$

Figure 8:
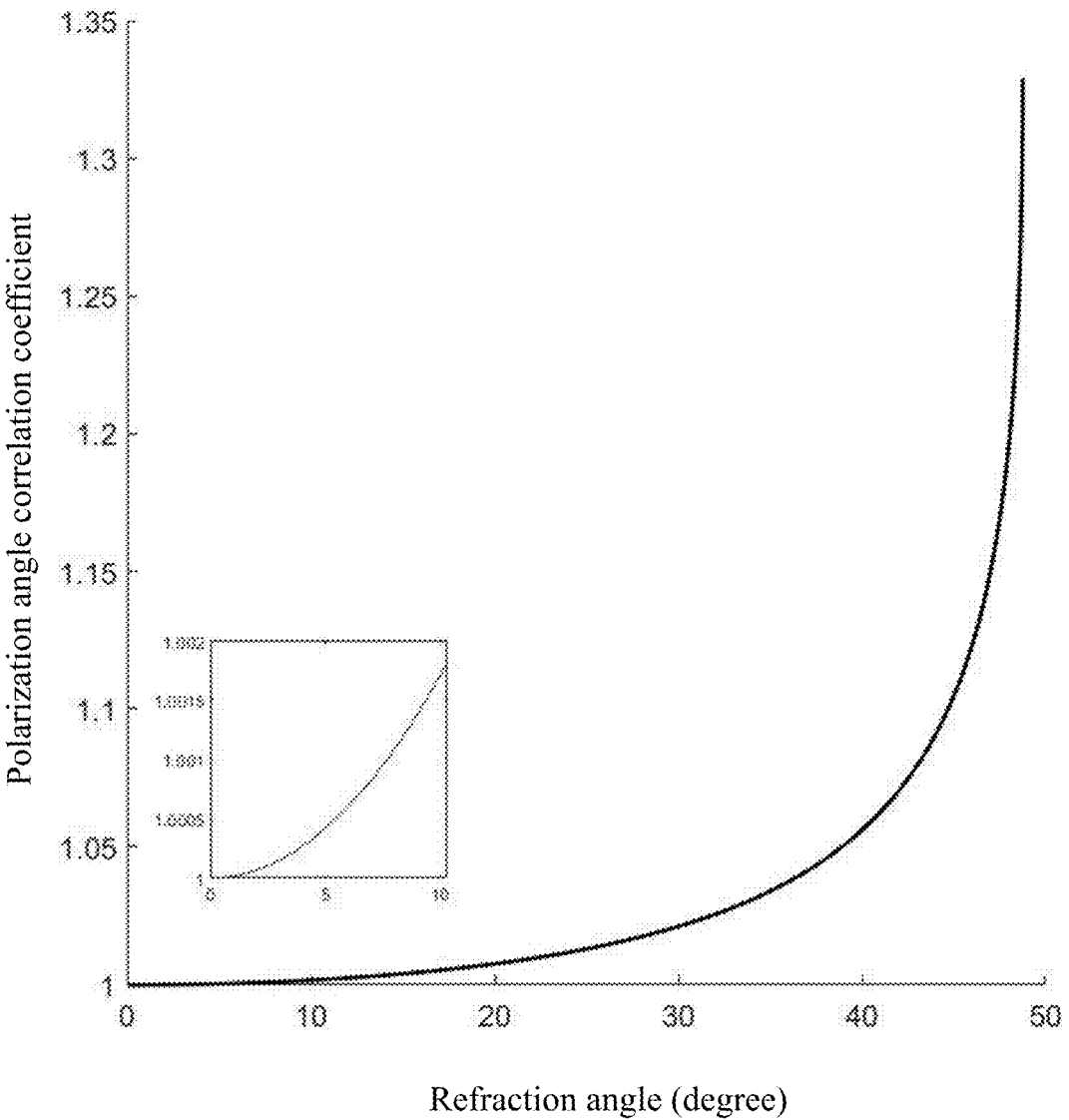
FIG. 8 is a graph of a polarization angle correlation coefficient as a function of a refraction angle according to Embodiment 1.

Therefore, the relationship between the atmospheric polarization angle $POA_i$ before refraction and the polarization angle $POA_d$ observed in water after refraction can be given by $S_d=M_R S_i$, where it is assumed that $POA_d=\mu POA_i$, and $\mu$ is the polarization angle correlation coefficient. The variation trend of u along with the refraction angle $\theta_r$ is obtained by modeling. As shown in FIG. 8, when the refraction angle $\theta_r<5°$, $\mu<1.0005$, which may be approximated to be 1. Within this refraction angle range, the polarization angle at which an observation point is observed in water is substantially identical to the polarization angle at which the observation point is observed at a corresponding observation point in air. Therefore, it can be considered that the polarization mode in water is consistent with the atmospheric polarization mode within this small window, which means that the polarized light components in the respective polarization analyzing channels hardly change at the detection point receiving the refracted polarized light. Moreover, the polarization direction of the underwater polarized light is still substantially perpendicular to the solar meridian, such that the heading angle measurement methods, such as obtaining the solar vector by vector cross-product designed according to the atmospheric polarization mode or obtaining the specific azimuth of the solar meridian based on comparison of atmospheric polarized light components, can be well applied to underwater environments, and measurement results with higher accuracy can be obtained.

This embodiment further discloses a heading angle measurement method for measuring a heading angle of an underwater vehicle by using the above underwater point source polarized light detection device, where the base 1 of the polarized light detection device is horizontally fixed on the underwater vehicle, and the heading angle measurement method includes the following steps:

In S1, a reference direction for resolving the heading angle of the underwater vehicle is determined, where the reference direction is required to have a fixed angle difference relative to the heading direction of the underwater vehicle, a reference polarization analyzing channel is selected from the paired polarization analyzing channels in each polarized light detection module, where the transmission directions of the selected reference polarization analyzing channels are the same, and the transmission directions of all the reference polarization analyzing channels are arranged to be parallel to the reference direction in an initial state, where it is assumed that the transmission directions of the paired polarization analyzing channels are $\theta_1$ and $\theta_2$, separately, $\theta_2 = 90° + \theta_1$, and the polarization analyzing channel with the transmission direction $\theta_1$ in the initial state is used as the reference polarization analyzing channel.

In S2, the rotating detection platform is controlled to continuously rotate in a horizontal direction, a detection voltage corresponding to each polarization analyzing channel on the rotating detection platform 2 is collected in real time until a difference between the detection voltages of each pair of polarization analyzing channels is maximized, and a rotation angle of the rotating detection platform relative to the reference direction at this time is recorded as $\theta_a$.

The difference here refers to the numerical difference of the detection voltages, which may be measured by, for example, the absolute value of the difference between the detection voltages of each pair of polarization analyzing channels. With the zenith polarized light detection module $10_a$ as an example, the reason for the maximized difference is as follows. When the transmission direction of one of the paired polarization analyzing channels with transmission directions perpendicular to each other is parallel to the solar meridian and the transmission direction of the other polarization analyzing channel is perpendicular to the solar meridian during the rotation of the rotating detection platform 2, since the distribution of the atmospheric polarized light follows the law that the direction of polarized light at the solar meridian and the anti-solar meridian is perpendicular to the solar meridian and the anti-solar meridian, which has been described above to be equally applicable to the underwater vehicle using the above underwater point source polarized light detection device, that is, for the polarized light detection points on the right side of the zenith and the left side of the zenith, the distribution of the underwater polarized light also follows the above law, which will not be repeated here, the light intensity of the polarized light transmitted through the polarization analyzing channel parallel to the solar meridian is minimized at this time, while the light intensity of the polarized light transmitted through the other polarization analyzing channel is maximized. Since the light intensity value of the polarized light is positively correlated with the detection voltage value, the difference of the light intensity values is maximized, which means that the difference of the detection voltage values is maximized. On the contrary, when the difference of the detection voltage values is maximized, it can be determined that the transmission direction of one polarization analyzing channel is necessarily parallel to the solar meridian, and the transmission direction of the other polarization analyzing channel is perpendicular to the solar meridian.

In S3, an included angle $\theta_s$ between the reference direction and projection lines of the solar meridian and the anti-solar meridian on corresponding detection points is calculated in combination with the rotation angle $\theta_a$ or the rotation angle $\theta_a$ and the perpendicular relationship of the transmission directions of the paired polarization analyzing channels, and the included angle $\theta_s$ is corrected in combination with polarization information of the detected zenith right-side polarized light and zenith left-side polarized light to obtain an included angle between the reference direction and the solar meridian, i.e., the heading angle $\beta$.

Specifically, in the S2, the difference between the detection voltages of each pair of polarization analyzing channels is determined to be maximized and the rotation angle $\theta_a$ at this time is recorded according to the following formula:

$$\theta_a = \arg\min\left\{\log\left[\frac{U_{\theta_1}}{U_{\theta_2}}\right]_{Middle} + \log\left[\frac{U_{\theta_1}}{U_{\theta_2}}\right]_{Right} + \log\left[\frac{U_{\theta_1}}{U_{\theta_2}}\right]_{Left}\right\}$$

Here, $$\log\left[\frac{U_{\theta_1}}{U_{\theta_2}}\right]_{Middle}, \log\left[\frac{U_{\theta_1}}{U_{\theta_2}}\right]_{Right}, \text{ and } \log\left[\frac{U_{\theta_1}}{U_{\theta_2}}\right]_{Left}$$

are separately logarithms of ratios of the detection voltage $U_{\theta_1}$ corresponding to the polarization analyzing channel with the transmission direction $\theta_1$ to the detection voltage $U_{\theta_2}$ corresponding to the polarization analyzing channel with the transmission direction $\theta_2$ in the zenith polarized light detection module, the zenith right-side polarized light detection module, and the zenith left-side polarized light detection module, which means that in the three sets of polarized light detection modules, when the detection voltage $U_{\theta_1}$ is minimized and the detection voltage $U_{\theta_2}$ is maximized, the rotation angle $\theta_a$ is recorded.

Figure 5:
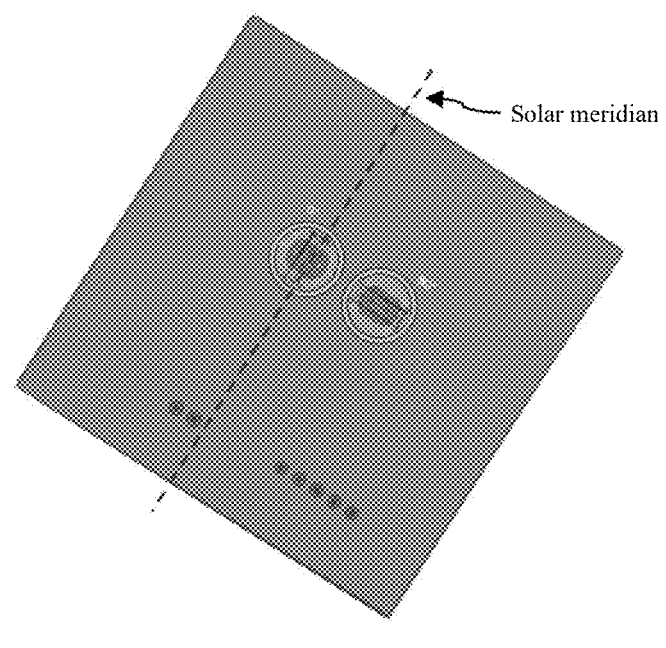
FIG. 5 is a diagram illustrating a positional relationship between the zenith polarized light detection module and a projection line of the solar meridian on a detection point at a rotation angle $\theta_a$ of the polarized light detection device according to Embodiment 1.

As shown in FIG. 5, as an embodiment, the detection voltage corresponding to the reference polarization analyzing channel in each pair of polarization analyzing channels is minimized while the difference between the detection voltages of each pair of polarization analyzing channels is maximized. When the detection voltage corresponding to the reference polarization analyzing channel in each pair of polarization analyzing channels is minimized, the transmission direction of the reference polarization analyzing channel is parallel to the solar meridian or the solar meridian plane. Since the transmission direction of the reference polarization analyzing channel is parallel to the reference direction in the initial state, and the rotating detection platform 2 is at the rotation angle $\theta_a$ relative to the reference direction at this time, i.e., the transmission direction of the reference polarization analyzing channel is at the rotation angle $\theta_a$, the included angle $\theta_s$ between the reference direction and the projection line of the solar meridian and the anti-solar meridian on the detection point can be calculated.

In the S3, a specific azimuth of the solar meridian is determined by using the collected detection voltages of the reference polarization analyzing channels in the zenith right-side polarized light detection module and the zenith left-side polarized light detection module in combination with a Rayleigh scattering model and a corresponding relationship between a polarization degree of the polarized light and the detection voltage in the polarization analyzing channel, so as to correct the included angle $\theta_s$ and obtain the heading angle $\beta$, where a range of the included angle $\theta_s$ is [0°, 180°], and a range of the heading angle $\beta$ is [0°, 360°]. Specifically, under the Rayleigh scattering model, the polarization degree on the solar meridian side is greater than that on the solar meridian side. According to the corresponding relationship between the polarization degree of the polarized light and the detection voltage in the polarization analyzing channel, the relationships between the total light intensities after the light passes through the reference polarization analyzing channels in the zenith right-side polarized light detection module and the zenith left-side polarized light detection module and the polarization degree of incident light are converted into the relationship between the detection voltage and the polarization degree of the incident light, and then the specific azimuth of the solar meridian can be determined by comparing the detection voltages of the two reference polarization analyzing channels.

Figure 3:
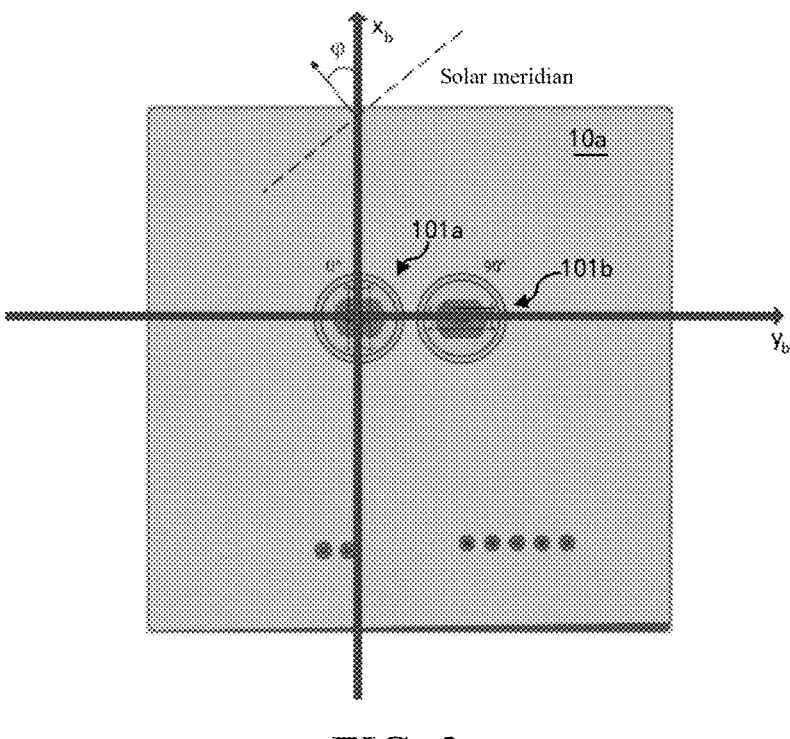
FIG. 3 is a schematic diagram illustrating an internal structure of a zenith polarized light detection module in an initial state according to Embodiment 1.
Figure 4:
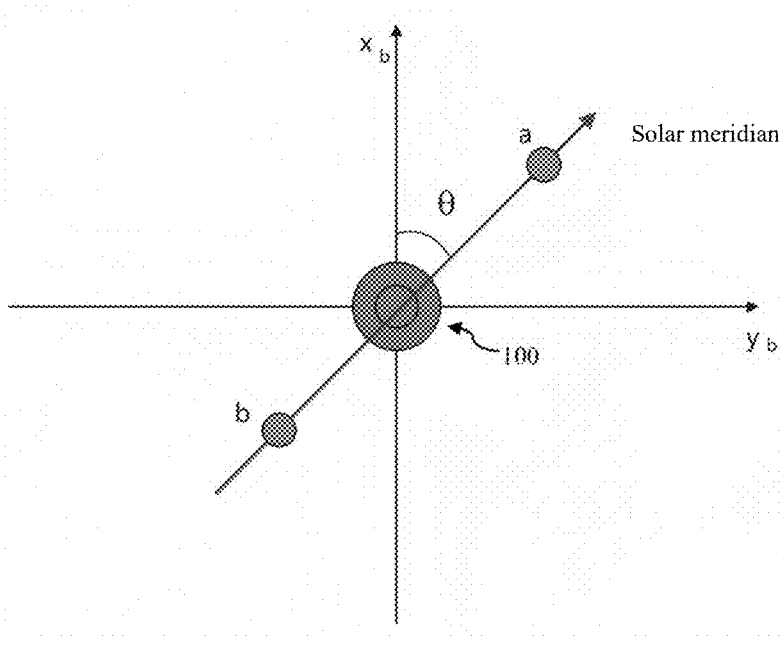
FIG. 4 is a diagram illustrating a positional relationship between a rotation angle of the polarized light detection device according to Embodiment 1 and the solar meridian.

As shown in FIGS. 3, 4, and 5, in this embodiment, the paired polarization analyzing channels include a 0° polarization analyzing channel 101$a$ with a transmission direction of 0° and a 90° polarization analyzing channel 101$b$ with a transmission direction of 90°. A body coordinate system of the underwater vehicle is established, where the arrow direction of the $x_b$ axis is a positive direction, i.e., the reference direction of the underwater vehicle, the $y_b$ axis is perpendicular to the $x_b$ axis, and the $x_b$ axis of the coordinate system is parallel to the transmission direction of the 0° polarization analyzing channel 101$a$. Assuming that the polarization direction of the detected zenith polarized light is at an angle $\varphi$ relative to the $x_b$ axis of the coordinate system of the 0° polarization analyzing channel 101$a$, it can be known from the Malus law that after the partially polarized light with the light intensity I and the polarization degree d passes through the two polarization analyzing channels, the light intensity $I_z$ without polarization is always:

$$I_z = \frac{1}{2}I(1-d)$$

After the light passes through the two polarization analyzing channels, the light intensity of the linearly polarized light is as follows:

$$\begin{cases} I_{pz0} = Id\cos^2(\varphi - 90) \\ I_{pz90} = Id\cos^2(\varphi) \end{cases}$$

Here, $I_{pz0}$ and $I_{pz90}$ are separately light intensities of the linearly polarized light after the light passes through the 0° polarization analyzing channel 101$a$ and the 90° polarization analyzing channel 101$b$.

Through trigonometric function transformation, the total light intensities sensed by the photodiodes are as follows:

$$\begin{cases} I_0 = \frac{1}{2}I(1 - d\cos(2\varphi)) \\ I_{90} = \frac{1}{2}I(1 + d\cos(2\varphi)) \end{cases}$$

Assuming that the rotating detection platform 2 is rotated by the angle $\theta$, the following formula is calculated:

$$U = \operatorname{argmin}\left\{\log\left[\frac{U_0}{U_{90}}\right]_{Middle} + \log\left[\frac{U_0}{U_{90}}\right]_{Right} + \log\left[\frac{U_0}{U_{90}}\right]_{Left}\right\}$$

Here, $U_0$ and $U_{90}$ are separately voltage values collected by the voltage detection components of the 0° polarization analyzing channel 101$a$ and the 90° polarization analyzing channel 101$b$, and the voltage value is in direct proportion to the total light intensity after the light passes through the polarization analyzing channel. In the formula, $$\log\left[\frac{U_o}{U_{90}}\right]_{Middle}, \log\left[\frac{U_o}{U_{90}}\right]_{Right}, \text{and} \log\left[\frac{U_o}{U_{90}}\right]_{Left}$$

are separately logarithms of ratios of the detection voltage $U_0$ corresponding to the polarization analyzing channel with the transmission direction $\theta°$ to the detection voltage $U_{90}$ corresponding to the polarization analyzing channel with the transmission direction 90° in the zenith polarized light detection module, the zenith right-side polarized light detection module, and the zenith detection left-side polarized light module. When the value of $$\log\left[\frac{U_o}{U_{90}}\right]_{Middle} + \log\left[\frac{U_o}{U_{90}}\right]_{Right} + \log\left[\frac{U_o}{U_{90}}\right]_{Left}$$

is minimum, the 0° polarization analyzing channels in the three detection modules are parallel to the solar meridian, and $\varphi=0°$ or 180°. In this case, the rotation angle $\theta_a=U$, $\theta_a$ is the angle $\theta$ at this time, and then the included angle between the solar meridian and the direction of the $x_b$ axis is $\theta$ or $\theta+180°$. That is, $\theta_s$ is $\theta$ or $\theta+180°$. The position of the sun may be point a or point b in FIG. 4.

In order to solve the 180° ambiguity problem appearing in the above detection result, the detection voltage $U_R$ corresponding to the polarization analyzing channel with the transmission direction of 0° in the zenith right-side detection module and the detection voltage $U_L$ corresponding to the polarization analyzing channel with the transmission direction of 0° in the zenith left-side detection module are obtained, separately. According to the above relationship between the total light intensity of the 0° polarization analyzing channel and the polarization degree, with $\varphi=0°$ or 180° being substituted into the relation, the total light intensity of the 0° polarization analyzing channel is determined to be inversely proportional to the polarization degree. Therefore, the detection voltage of the polarization analyzing channel is also inversely proportional to the polarization degree, and then the heading angle $\beta$ is calculated according to the distribution law of the atmospheric polarization degrees at two sides of the solar meridian and the anti-solar meridian:

$$\beta = \begin{cases} \theta_s, & U_L < U_R \\ \theta_s + 180^\circ, & U_L > U_R \end{cases}$$

Therefore, the 180° ambiguity problem present in the heading angle measurement process is solved. That is, the range of the included angle $\theta_s$ is expanded from [0°, 180°] to [0°, 360°], thereby realizing full heading angle measurement of the underwater vehicle.

As another embodiment, in the S2, the difference between the corresponding detection voltages of each pair of polarization analyzing channels is determined to be maximized and the rotation angle $\theta_a$ at this time is recorded according to the following formula:

$$\theta_a = \mathrm{argmax}\left\{ \log\left[\frac{U_{\theta_2}}{U_{\theta_1}}\right]_{Middle} + \log\left[\frac{U_{\theta_2}}{U_{\theta_1}}\right]_{Right} + \log\left[\frac{U_{\theta_2}}{U_{\theta_1}}\right]_{Left} \right\}$$

where $$\log\left[\frac{U_{\theta_2}}{U_{\theta_1}}\right]_{Middle}, \log\left[\frac{U_{\theta_2}}{U_{\theta_1}}\right]_{Right}, \text{ and } \log\left[\frac{U_{\theta_2}}{U_{\theta_1}}\right]_{Left}$$

are separately logarithms of ratios of the detection voltage $U_{\theta_2}$ corresponding to the polarization analyzing channel with the transmission direction $\theta_2$ to the detection voltage $U_{\theta_1}$ corresponding to the polarization analyzing channel with the transmission direction $\theta_1$ in the zenith polarized light detection module, the zenith right-side polarized light detection module, and the zenith left-side polarized light detection module.

Here, although the formula for calculating the difference between the detection voltages of each pair of polarization analyzing channels is different from the above idea for calculating the minimum value of $$\log\left[\frac{U_{\theta_1}}{U_{\theta_2}}\right]_{Middle} + \log\left[\frac{U_{\theta_1}}{U_{\theta_2}}\right]_{Right} + \log\left[\frac{U_{\theta_1}}{U_{\theta_2}}\right]_{Left}$$

to some extent, they are generated from the same concept, i.e., the rotation angle $\theta_a$ is recorded when the ratio of the detection voltages of the polarization analyzing channels reaches the extreme value. The difference between the detection voltages is maximized when the ratio of the detection voltages of the polarization analyzing channels reaches the extreme value. At this time, the transmission direction of one of the polarization analyzing channels is parallel to the solar meridian, and the transmission direction of the other polarization analyzing channel is perpendicular to the solar meridian, and then the range of the included angle $\theta_s$ is obtained according to this law.

Embodiment 2

Figure 6:
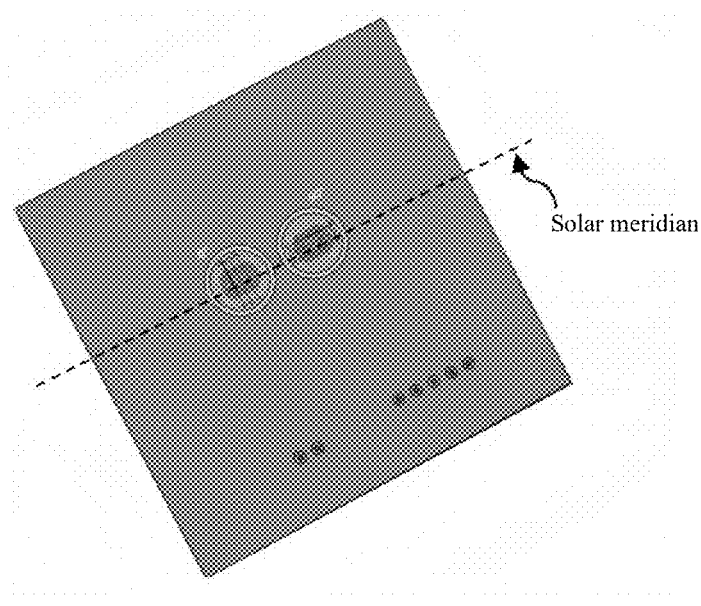
FIG. 6 is a diagram illustrating a positional relationship between the zenith polarized light detection module and a projection line of the solar meridian on a detection point at a rotation angle $\theta_a$ of the polarized light detection device according to Embodiment 2.

This embodiment is different from Embodiment 1 in that in the S2, the detection voltage corresponding to the reference polarization analyzing channel in each pair of polarization analyzing channels is maximized while the difference between the corresponding detection voltages of each pair of polarization analyzing channels is maximized. As shown in FIG. 6, the paired polarization analyzing channels are still illustrated as the 0° polarization analyzing channel 101a and the 90° polarization analyzing channel 101b. In this case, when the 0° polarization analyzing channel 101a is selected as the reference polarization analyzing channel, the detection voltage of the 0° polarization analyzing channel 101a is maximized while the difference between the corresponding detection voltages of the polarization analyzing channels is maximized, which means that the transmission direction of the 0° polarization analyzing channel 101a is perpendicular to the direction of the solar meridian, and the transmission direction of the 90° polarization analyzing channel 101b is parallel to the direction of the solar meridian at this time. Since the positional relationship between the transmission directions of the two polarization analyzing channels and the direction of the solar meridian has been obtained, the range of the included angle $\theta_s$ can be derived. Then, the heading angle $\beta$ is calculated according to the distribution law of the atmospheric polarization degrees at two sides of the solar meridian and the anti-solar meridian, such that full heading angle measurement can be realized as well. The unstated remaining parts are the same as those in Embodiment 1, and will not be repeated herein.

In summary, the heading angle measurement method in this embodiment can determine whether or not the reference polarization analyzing channel rotates to the position parallel or perpendicular to the solar meridian plane, i.e., the plane of the solar meridian and the anti-solar meridian, only by monitoring the magnitudes and the differences of the detection voltage values of the paired polarization analyzing channels in the three sets of polarized light detection modules. Then, the value of the included angle $\theta_s$ within a range of [0°, 180°] can be calculated in combination with the rotation angle of the reference polarization analyzing channel along with the rotating detection platform 2. The range of the included angle $\theta_s$ is expanded to [0°, 360°] in combination with the distribution law of the polarization degrees at two sides of the solar meridian and the anti-solar meridian under the Rayleigh scattering model. Therefore, the 180-degree ambiguity problem present in the heading angle measurement process is solved with reduced resolving steps required and a single type of variables to be monitored in the measurement process, i.e., accurate full heading angle measurement can be realized only by monitoring the detection voltage of each polarization analyzing channel, which is convenient for consistency and certainty analysis of parameters in each polarization analyzing channel, thereby improving the accuracy and reliability of the measurement results.

Moreover, each polarized light detection module on the rotating detection platform 2 only uses two polarization analyzing channels with transmission directions perpendicular to each other to detect polarized light. Compared with the prior art, while the technical purpose of full heading angle measurement of the underwater vehicle is achieved, the number and types of the used detection light channels are reduced, allowing a simpler structure of the detection device, simple and efficient processing of information of each polarization analyzing channel, and reduced costs of heading angle measurement.

In the specification, the same and similar parts of the embodiments can be referred to each other, and each embodiment focuses on the differences from other embodiments. In particular, for the embodiments described later, the description is relatively simple, and reference may be made to some descriptions of the foregoing embodiments for relevant parts.

The above descriptions are only specific embodiments of the present disclosure, but the protection scope of the present disclosure is not limited to these. Any variations or substitutions that can be easily conceived by those skilled in the art within the technical scope disclosed herein should be covered within the protection scope of the present disclosure. Therefore, the protection scope of the present disclosure shall be subject to the protection scope of the claims.

The invention claimed is:

1. An underwater point source polarized light detection device, comprising a base, a rotating detection platform provided on the base, and a first detection module, a second detection module, and a third detection module provided on top of the rotating detection platform, wherein:

the first detection module is configured to receive and detect zenith polarized light, the second detection module is configured to receive and detect zenith right-side polarized light, and the third detection module is configured to receive and detect zenith left-side polarized light, each of the first, the second, and the third detection modules comprises a pair of polarization analyzing channels with transmission axes thereof perpendicular to each other, the second and the third detection modules are positioned such that polarized light detection directions thereof are bilaterally symmetric in the same plane about a zenith polarized light detection direction and that an included angle between each of the polarized light detection directions and the zenith polarized light detection direction does not exceed 5°, and the rotating detection platform is configured to be rotatable for 360° about an axis of the zenith polarized light detection direction, and each polarization analyzing channel comprises a polarization analyzer, and a light intensity detector, and a voltage detector that is electrically connected to the light intensity detector.

2. A heading angle measurement method for measuring a heading angle of an underwater vehicle, comprising the following steps:

S0: mounting the underwater point source polarized light detection device according to claim 1 on the underwater vehicle;

S1: determining a reference direction for resolving a heading angle of the underwater vehicle, selecting a reference polarization analyzing channel in each of the first, the second, and the third detection modules, and arranging the transmission directions of all the selected reference polarization analyzing channels to be parallel to the reference direction in an initial state;

S2: continuously rotating the rotating detection platform in a horizontal direction, collecting a detection voltage corresponding to each polarization analyzing channel on the rotating detection platform in real time until a difference between the detection voltages of each pair of polarization analyzing channels is maximized, and recording a rotation angle of the rotating detection platform relative to the reference direction at this time as $\theta_a$;

and S3: calculating, using in combination with the rotation angle $\theta_a$, an included angle $\theta_s$ between the reference direction and projection lines of a solar meridian and an anti-solar meridian on corresponding detection points, and correcting the included angle $\theta_s$ in combination with polarization information of the detected zenith right-side polarized light and zenith left-side polarized light to obtain an included angle between the reference direction and the solar meridian that is the heading angle $\beta$.

3. The underwater point source polarized light detection device according to claim 1, wherein a reference plane, a left mounting surface, and a right mounting surface are disposed on top of the rotating detection platform, wherein the reference plane, the left mounting surface, and the right mounting surface form a top base, a left leg, and a right leg of an imaginary isosceles trapezoid, respectively, and the first, the second, and the third detection modules are disposed on the reference plane, the left mounting surface, and the right mounting surface, respectively.

4. The heading angle measurement method according to claim 2, wherein in the S2, the detection voltage corresponding to the reference polarization analyzing channel in each pair of polarization analyzing channels is maximized while the difference between the corresponding detection voltages of each pair of polarization analyzing channels is maximized.

5. The heading angle measurement method according to claim 2, wherein in the S3, a specific azimuth of the solar meridian is determined by using the collected detection voltages of the reference polarization analyzing channels in the second detection module and the third detection module in combination with a Rayleigh scattering model and a corresponding relationship between a polarization degree of the polarized light and the detection voltage in the polarization analyzing channel, so as to correct the included angle $\theta_s$ and obtain the heading angle $\beta$, wherein a range of the included angle $\theta_s$ is [0°, 180°], and a range of the heading angle $\beta$ is [0°, 360°].

6. The heading angle measurement method according to claim 2, wherein in the S1-S2, the transmission directions of the paired polarization analyzing channels are $\theta_1$ and $\theta_2$, respectively, $\theta_2=90°+\theta_1$, the polarization analyzing channel with the transmission direction $\theta_1$ in an initial state is used as the reference polarization analyzing channel, and the detection voltage corresponding to the reference polarization analyzing channel in each pair of polarization analyzing channels is at a minimum when the difference between the detection voltages of each pair of polarization analyzing channels is maximized.

7. The heading angle measurement method according to claim 6, wherein in the S2, the difference between the detection voltages of each pair of polarization analyzing channels is determined to be maximized and the rotation angle $\theta_a$ at this time is recorded according to the following formula:

$$\theta_a = \left\{ \log\left[\frac{U_{\theta_1}}{U_{\theta_2}}\right]_{Middle} + \log\left[\frac{U_{\theta_1}}{U_{\theta_2}}\right]_{Right} + \log\left[\frac{U_{\theta_1}}{U_{\theta_2}}\right]_{Left} \right\}$$

wherein $$\log\left[\frac{U_{\theta_1}}{U_{\theta_2}}\right]_{Middle}, \log\left[\frac{U_{\theta_1}}{U_{\theta_2}}\right]_{Right}, \text{ and } \log\left[\frac{U_{\theta_1}}{U_{\theta_2}}\right]_{Left}$$

are respectively logarithms of ratios of the detection voltage $U_{\theta_1}$ corresponding to the polarization analyzing channel with the transmission direction $\theta_1$ to the detection voltage $U_{\theta_2}$ corresponding to the polarization analyzing channel with the transmission direction $\theta_2$ in the first detection module, the second detection module, and the third detection module.

8. The heading angle measurement method according to claim 5, wherein when $\theta_1 = 0°$, and then $\theta_2 = 90°$, the heading angle $\beta$ is calculated according to the following relation:

$$\beta = \begin{cases} \theta_s, & U_L < U_R \\ \theta_s + 180°, & U_L > U_R \end{cases}$$

wherein $U_R$ is the detection voltage corresponding to the polarization analyzing channel with the transmission direction of $0°$ in the second detection module, and $U_L$ is the detection voltage corresponding to the polarization analyzing channel with the transmission direction of $0°$ in the third detection module.

9. The heading angle measurement method according to claim 6, wherein in the S2, the difference between the corresponding detection voltages of each pair of polarization analyzing channels is determined to be maximized and the rotation angle $\theta_a$ at this time is recorded according to the following formula:

$$\theta_a = \text{argmax}\left\{ \log\left[\frac{U_{\theta_2}}{U_{\theta_1}}\right]_{Middle} + \log\left[\frac{U_{\theta_2}}{U_{\theta_1}}\right]_{Right} + \log\left[\frac{U_{\theta_2}}{U_{\theta_1}}\right]_{Left} \right\}$$

wherein $$\log\left[\frac{U_{\theta_2}}{U_{\theta_1}}\right]_{Middle}, \log\left[\frac{U_{\theta_2}}{U_{\theta_1}}\right]_{Right}, \text{ and } \log\left[\frac{U_{\theta_2}}{U_{\theta_1}}\right]_{Left}$$

are separately logarithms of ratios of the detection voltage $U_{\theta_2}$ corresponding to the polarization analyzing channel with the transmission direction $\theta_2$ to the detection voltage $U_{\theta_1}$ corresponding to the polarization analyzing channel with the transmission direction $\theta_1$ in the first detection module, the second detection module, and the third light detection module.

* * * * *